United States Patent [19]
Moriya et al.

[11] 4,146,511
[45] Mar. 27, 1979

[54] RESIN COMPOSITIONS FOR PEEL-OFF COATINGS COMPRISING A FILM-FORMING POLYMERIC RESIN, AN ORGANO POLYSILOXANE AND A SOLVENT

[75] Inventors: Iwao Moriya, Kitamoto; Toru Sema, Yokohama; Sigeyosi Hatasa, Chiba, all of Japan

[73] Assignees: Shin-Estu Chemical Co., Ltd.; The Lion Dentifrice Co., Ltd., both of Tokyo, Japan

[21] Appl. No.: 854,336

[22] Filed: Nov. 23, 1977

[30] Foreign Application Priority Data

Nov. 29, 1976 [JP] Japan .................... 51/143186

[51] Int. Cl.$^2$ .................... C08L 1/10; C08L 1/12; C08L 1/18; C08L 31/04
[52] U.S. Cl. .................... 260/3; 260/13; 260/29.2 M; 260/29.6 NR; 260/29.6 R; 260/29.6 B; 260/30.4 R; 260/30.4 SB; 260/31.2 R; 260/32.8 R; 260/32.8 SB; 260/33.2 R; 260/33.2 SB; 260/33.4 R; 260/33.4 SB; 260/33.6 R; 260/33.6 SB; 260/33.8 R; 260/33.8 SB; 260/825; 260/827
[58] Field of Search ....... 260/3, 13, 29.2 M, 29.6 NR, 260/29.6 R, 29.6 B, 30.4 R, 30.4 SB, 31.2 R, 32.8 R, 32.8 SB, 33.2 R, 33.2 SB, 33.4 R, 33.4 SB, 33.6 R, 33.6 SB, 33.8 R, 33.8 SB, 825, 827

[56] References Cited

U.S. PATENT DOCUMENTS

| 3,305,504 | 2/1967 | Huntington | 260/827 |
|---|---|---|---|
| 3,471,588 | 10/1969 | Kanner et al. | 260/827 |
| 3,505,377 | 4/1970 | Morehouse | 260/29.2 M |
| 3,576,904 | 4/1971 | Saam et al. | 260/825 |
| 3,691,257 | 9/1972 | Kendrick et al. | 260/13 |
| 3,709,956 | 1/1973 | Nordstrom | 260/827 |

*Primary Examiner*—M. J. Welsh
*Attorney, Agent, or Firm*—Toren, McGeady and Stanger

[57] ABSTRACT

The resin compositions for peel-off coatings comprise a certain film-forming polymeric resin, an organopolysiloxane having a polyoxyalkylene group as the side chain, and a solvent. The coating compositions applied to the surfaces of various shaped articles provide protective films thereon, and the films thus formed are tough and can exhibit an excellent peelability even after the lapse of a long period of time or after heating. The coating resin compositions are prepared by a method comprising heating the mixture of the above-named individual components at an elevated temperature, not at room temperature.

7 Claims, No Drawings

RESIN COMPOSITIONS FOR PEEL-OFF COATINGS COMPRISING A FILM-FORMING POLYMERIC RESIN, AN ORGANO POLYSILOXANE AND A SOLVENT

BACKGROUND OF THE INVENTION

The present invention relates to improved resin compositions for peel-off coatings and a method for the preparation of same.

Peel-off coatings formed by a coating composition serve to protect the surfaces of various shaped articles. For example, the peel-off coatings applied to the surfaces of an electric part, machine part or the like are intended to protect those surfaces from being soiled or mechanically or chemically damaged during storage or shipment. Such coatings are subjected to peeling after the storage or shipment and just before actual use of the article, so that the intrinsic surfaces will be exposed for proper functioning or operation.

As a further example, the peel-off coatings applied to the surfaces of an article which is for use in an environment liable to cause heavy staining or soiling, such as ventilation fans used in a cooking room, can be peeled off as and when stained to such an extent as to necessitate cleaning, so that the exposed surfaces are ready for recoating. This leads to a saving of cleaning labor much more than otherwise.

The above peel-off coatings have not been found to be always satisfactory to meet the following requirements: (1) that coating films should be maintained completely adherent to substrate throughout their life, i.e., from formation to peel-off, (2) that coating films should have a stable peelability, (3) that coating films as the protective coating should have sufficiently high mechanical strengths and resistance to water and chemicals, (4) that the peelability and strengths of coating films should be good even at elevated temperatures, (5) that coating can be carried out either by brushing or spraying, and (6) that coating compositions should have a high drying velocity.

One typical example of the coating compositions to form the peel-off coatings, which is of the aqueous emulsion type and most widely used, is a polyvinyl acetate emulsion or an acrylic resin emulsion. These emulsions are defective with respect of heat stability, resistance to water, and stability in storage. For example, those disclosed in Japanese Patent Publication No. 14770/73, which are prepared by adding floury materials, such as calcium carbonate and titanium dioxide, silicone resins, and an aqueous emulsion of paraffin wax, are defective in their poor stability when stored for a long time and also in their low drying velocity after application.

Besides the above aqueous emulsion type coating compositions, solution-type compositions are also known, which are prepared by dissolving a polyvinyl butyral resin and a plasticizer in an organic solvent. Those compositions are disadvantageous due to the restrictions in the selection and amount of the plasticizer to be used and also the possibility of bleeding or migration occurring to the plasticizer used. In addition, the resultant coating films sometimes exhibit a low peelability when provided on surfaces of certain materials.

Further, it should be added that the inventors of the present invention disclosed an improved similar peel-off coating composition which comprises a polyvinyl acetal resin as the film-forming resin material and an organopolysiloxane having a polyoxyalkylene group as the side chain in their Copending U.S. Patent Application Ser. No. 699,598, filed June 24, 1976. This composition, however, has been found to be still somewhat disadvantageous due to the fact that the resultant coating films exhibit rather a poor peelability after prolonged heating at an elevated temperature of, say, 60° C. or higher.

SUMMARY OF THE INVENTION

The present invention has been completed as a result of extensive researches for the preparation of further improved coating compositions suitable for providing peel-off coatings which have an excellent peelability even after prolonged heating and storage and which, at the same time, are free of the above-described drawbacks encountered in similar compositions hitherto known.

In accordance with the present invention, the coating resin compositions comprise the following components:

(a) 100 parts by weight of at least one film-forming resin selected from the group consisting of polyvinyl chloride resins, polyvinyl acetate resins, vinyl chloride-vinyl acetate copolymeric resins, acrylic resins, polyvinyl alcohols, polyethylenes, methyl cellulose, ethyl cellulose, nitrocellulose, acetyl cellulose, acetylbutyl cellulose, and natural rubber, (b) from 0.1 to 40 parts by weight of at least one organopolysiloxane represented by the general formula

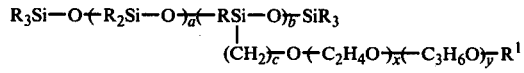

where R is a substituted or unsubstituted monovalent hydrocarbon group, $R^1$ is a hydrogen atom or a monovalent hydrocarbon group, a has a value from zero to 150 inclusive, b has a value from 2 to 50 inclusive, c has a value from zero to 5 inclusive, x has a value from 2 to 40 inclusive and y has a value from zero to 40 inclusive, and (c) a solvent.

The present invention is based, in part, on the discovery that the organopolysiloxanes defined above have an excellent compatibility with the specified film-forming resins and that the formulation as set forth above is capable of producing excellent peel-off coatings as will be illustrated by way of examples hereunder.

DETAILED DESCRIPTION OF THE PREFERRED EMBODIMENTS

The film-forming resins as component (a) useful in the compositions of the present invention are selected from the group consisting of thermoplastic resins, such as, polyvinyl chloride resins, polyvinyl acetate resins, vinyl chloride-vinyl acetate copolymeric resins, acrylic resins, polyvinyl alcohols and polyethylenes; cellulose derivatives, such as, methyl cellulose, ethyl cellulose, nitrocellulose, acetyl cellulose and acetylbutyl cellulose; and rubbers, such as, natural rubber.

The organopolysiloxanes as component (b) useful in the invention are represented by the specified general formula. Illustrative of the substituted or unsubstituted monovalent hydrocarbon groups denoted by symbol R in the formula, which can be same or different, are alkyl groups, such as methyl, ethyl and propyl groups; alkenyl groups, such as vinyl, allyl and cyclohexenyl groups; cycloalkyl groups, such as cyclohexyl and cycloheptyl groups; aryl groups, such as phenyl, tolyl and xylyl groups; aralkyl groups, such as benzyl and phenylethyl groups; and halogen-substituted monovalent hydrocarbon groups, such as chlorophenyl, tetrachlorophenyl, chloromethyl and pentafluorobutyl groups. In the same formula, the group denoted by symbol $R^1$ is a hydrogen atom or a monovalent hydrocarbon group, the former being preferred.

The examples of the organopolysiloxanes as component (b) are those represented by the following formulas, in which Me, Et and Ph denote methyl, ethyl and phenyl groups, respectively.

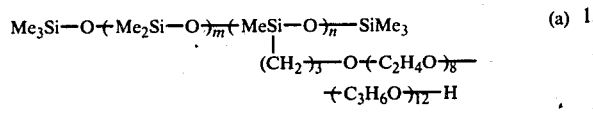
(a)

where m is an integer from 1 to 150 and n is an integer from 2 to 50.

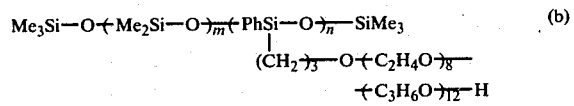
(b)

where m is an integer from 1 to 100 and n is an integer from 2 to 50.

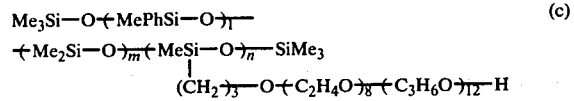
(c)

where l is an integer from 1 to 50, m is an integer from 1 to 100 and n is an integer from 2 to 50.

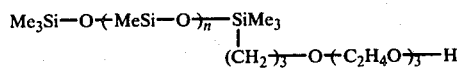
(d)

where n is an integer from 2 to 50.

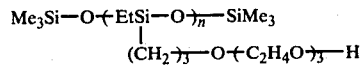
(e)

where n is an integer from 2 to 50.

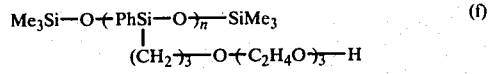
(f)

where n is an integer from 2 to 50.

These organopolysiloxanes may be employed either singly or in combination of two or more in the formulation of the coating compositions in accordance with the present invention.

The polyoxyalkylene group as the side chain in component (b) is bonded to the silicon atom in the main chain through the Si—C linkage or Si—O—C linkage, the former type of linkage being preferred because of its higher stability against hydrolysis. The terminal of the polyoxyalkylene group is blocked with a hydrogen atom or a monovalent hydrocarbon group, such as an alkyl or aryl group. The hydrogen terminal is preferred from the point of view that the organopolysiloxanes having the polyoxyalkylene side chain which is terminated with the monovalent hydrocarbon group have sometimes an inferior compatibility with the film-forming vehicle resins depending on the nature of the resins, or that the resultant compositions tend to give somewhat a poorer peelability to the coating films formed therefrom.

The protective coating films formed from the resin compositions of the present invention have excellent water resistance, heat stability and mechanical strengths as well as satisfactory peelability.

The amount of component (b) in the coating composition ranges from 0.1 to 40 parts by weight or, preferably, from 1 to 30 parts by weight based on 100 parts by weight of component (a). Any smaller amounts may impart insufficient peelability to the resultant coating film, while any larger amounts result in no particular effectiveness, but economical losses.

The solvents suitable for use as component (c) in the coating compositions of the present invention are required to have miscibility with the film-forming resin as component (a), and may be selected from a number of the following solvents. Water, alcohols, such as methanol, ethanol, propanol and butanol; aliphatic hydrocarbons, such as hexane and pentane; aromatic hydrocarbons, such as benzene, toluene and xylene; ketones, such as acetone and methylethylketone; ethers such as diethylether, dioxane and tetrahydrofuran; esters, such as ethyl acetate, propyl acetate and butyl acetate; and halogenated hydrocarbons, such as trichloroethylene and carbon tetrachloride. It is another requirement for the solvents not to work to swell or dissolve a portion or portions of plastics, such as an acrylic resin or polystyrene, formed on a shaped article which has been coated with the finished composition. The amount of the solvent is not narrowly critical and may, as a general standard, be 5% by weight or more based on the total weight of components (a) and (b), so that the resultant compositions can have a viscosity enough to ensure a sufficient workability.

The coating compositions of the present invention can be prepared by blending components (a), (b) and (c) under stirring with heat, to form a homogeneous mixture and then by heating the mixture. The temperatures of the heating may vary depending on the type, the degree of polymerization, etc. of the film-forming resin, but it is generally between 40° C. and the boiling point of the solvent employed, with such heating for about 1 to 6 hours.

The peel-off or strippable coating compositions of the present invention may include various known additives, such as, plasticizers, e.g. phthalic esters, phosphoric esters, esters of carboxylic acids, and glycol derivatives; fatty oils, e.g. vegetable oils; pigments, and the like according to need in order to further improve or modify the flexibility, color tone or other properties of the coating films formed therewith.

The coating compositions of the present invention are useful for providing peelable protective coating films on various shaped substrates of plastics or metals. The peelability of the coating films can not be lost even after a prolonged exposure to an elevated temperature. Because of such advantages of the protective coating films, the articles to which the compositions are suitably applied include, for example, ventilation fans, kitchenware, building materials, automobiles and the like.

The following examples illustrate the present invention. In the examples, parts are all parts by weight.

EXAMPLE 1

Seven clear solutions Nos. 1 to 7 were prepared each by dissolving the film-forming resin and the single organopolysiloxane or a mixture of the organopolysiloxanes S-1, S-2, S-3, S-4 and S-5 as mentioned below in combination in a single solvent or mixed solvents, as set forth in Table I, and then heating the resulting mixtures at 60° C. for 2 hours under stirring.

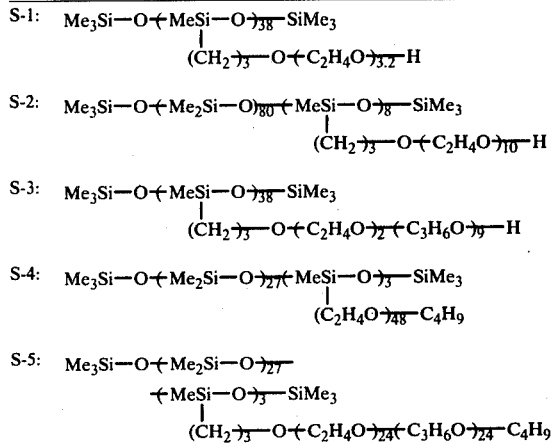

S-1: $Me_3Si-O+MeSi-O)_{38}-SiMe_3$
              |
         $(CH_2)_3-O+C_2H_4O)_{3.2}-H$

S-2: $Me_3Si-O+Me_2Si-O)_{80}+MeSi-O)_8-SiMe_3$
                                  |
                           $(CH_2)_3-O+C_2H_4O)_{10}-H$

S-3: $Me_3Si-O+MeSi-O)_{38}-SiMe_3$
              |
         $(CH_2)_3-O+C_2H_4O)_2+C_3H_6O)_3-H$

S-4: $Me_3Si-O+Me_2Si-O)_{27}+MeSi-O)_3-SiMe_3$
                              |
                        $(C_2H_4O)_{48}-C_4H_9$

S-5: $Me_3Si-O+Me_2Si-O)_{27}-$
        $+MeSi-O)_3-SiMe_3$
              |
        $(CH_2)_3-O+C_2H_4O)_{24}+C_3H_6O)_{24}-C_4H_9$

Note:
Me = Methyl

Table I

| Solution No. | Film-forming resin (parts) | Organopolysiloxane (parts) | Solvent(s) (parts) |
|---|---|---|---|
| 1 | Polyvinyl acetate resin (100) | S-1 (10) + S-2 (10) | Water (100) + Ethanol (400) |
| 2 | " | S-1 (10) | " |
| 3 | Methyl cellulose (100) | S-2 (0.3) + S-3 (5) + S-4 (3) | Water (150) + Ethanol (350) |
| 4 | " | S-5 (7) | " |
| 5 | Polymethyl methacrylate resin (100) | S-1 (15) | Ethanol (250) + Toluene (250) |
| 6* | Polyvinyl butyral resin (100) | S-1 (15) | Ethanol (500) |
| 7* | " | S-5 (15) | " |

*Solution for comparison.

Each of the above coating solutions was applied on a substrate of polystyrene resin, aluminum or a surface coated with a white lacquer of heat-curable melamine resin, and the coated surfaces were kept at room temperature or at 70° C. for a period of 2 weeks. Thereupon, the coating films formed on the three different substrate surfaces were subjected to the peel-off test to determine their peelability, by ratings A, B and C. The results are set out in Table II. Here, rating A is conferred on the coating film that was easily peeled off without trouble or without being torn in pieces; rating B is conferred on the coating film that was partly remained unpeeled and adhered to the substrate apparently due to resistance against the peeling force; and rating C is conferred on the coating film that could not be peeled off due to its strong adhesion to the substrate.

Table II

| Coating solution No. | Polystyrene resin ** | Polystyrene resin *** | Aluminum ** | Aluminum *** | Melamine lacquer coated surface ** | Melamine lacquer coated surface *** |
|---|---|---|---|---|---|---|
| 1 | A | A | A | A | A | A |
| 2 | A | A | B | B | B | B |
| 3 | A | A | A | A | A | A |
| 4 | B | B | B | B | B | B |
| 5 | A | B | A | A | A | A |
| 6* | A | B | A | C | A | B |
| 7* | B | C | B | C | B | C |

Notes to Table II:
*Solution for comparison.
**Indicating peelability after keeping at room temperature for 2 weeks.
***Indicating peelability after heating at 70° C for 2 weeks.

It may be known from the above test results that the coating compositions to be used on the substrate of polystyrene resin or the surface coated with heat-curable melamine lacquer are preferably in the form of a solution in a lower alcohol and/or water as the solvents and, hence, the film-forming vehicle resin should be selected from alcohol-soluble resins, such as polyvinyl acetate resins, and water-soluble polymeric substances, such as methylcellulose, polyvinyl alcohol and water-soluble acrylic resins.

The peel-off coating compositions of the present invention as formulated with the combinations of the solvents, the film-forming vehicle resin and the organopolysiloxane as described hereinabove are suitable for application not only on the surfaces of plastics and heat-curable lacquer-coated surfaces but also on the surfaces of metals, glass and marble stones and the like in general, and the resulting coating films have excellent resistance to heat and oils as well as to water.

EXAMPLE 2

Nine clear solutions Nos. 8 to 16 were prepared each by dissolving the film-forming resin and the organopolysiloxane S-1 or S-2 defined in the description of Example 1 in combination in mixed solvents as set forth in Table III, and then heating the resulting mixtures under reflux of the solvents for 2 hours with stirring.

Table III

| Solution No. | Film-forming resin (parts) | Organopolysiloxane (parts) | Solvents (parts) |
|---|---|---|---|
| 8 | Vinyl chloride-vinyl acetate copolymer** (20) | S-1 (3) | Methylethyl ketone (40) + Toluene (40) |
| 9 | " | S-2 (3) | " |
| 10 | Natural rubber (20) | " | Methylethyl ketone (70) + n-Hexane (30) |
| 11 | Polyvinyl chloride resin (20) | S-1 (1) | Benzene (20) + Toluene (40) + Ethyl acetate (30) + Butyl acetate (10) |
| 12 | polyvinyl alcohol (20) | S-2 (3) | Ethyl alcohol (80) + Water (20) |
| 13 | Polyethylene (20) | " | Toluene (50) + Ethylene chloride (50) |
| 14 | Acethyl cellulose (20) | S-2 (3) | Acetone (90) + Methyl alcohol (10) |
| 15* | Polyvinyl butyral resin (20) | " | Methylethyl ketone (40) + Toluene (40) |
| 16* | Vinyl chloride-vinyl acetate | None | " |

Table III-continued

| Solution No. | Film-forming resin (parts) | Organopoly-siloxane (parts) | Solvents (parts) |
|---|---|---|---|
| | copolymer** (20) | | |

*Solution for comparison.
**Composed of 90% by weight of vinyl chloride and 10% by weight of vinyl acetate.

Each of the above coating solutions was applied on a panel of steel whose surface had been polished by sand blasting, and the coated surfaces were kept at room temperature or at 70° C. for a period of 2 weeks. Thereupon, the coating films formed on the surfaces were tested for their peelability by ratings A, B and C as defined in the description of Example 1. Then, the exposed surface of each steel panel was visually examined with respect to the occurrence of rusting. The results are set out in Table IV.

Table IV

| Solution No. | Peelability ** | Peelability *** | Rusting ** | Rusting *** |
|---|---|---|---|---|
| 8 | A | A | Slight | Slight |
| 9 | A | A | None | None |
| 10 | A | A | None | None |
| 11 | A | A | None | None |
| 12 | A | A | None | Slight |
| 13 | A | A | None | None |
| 14 | A | A | Slight | Slight |
| 15* | A | C | None | None |
| 16* | C | C | Slight | Slight |

*Solution for comparison.
**Indicating peelability or rusting after keeping at room temperature for 2 weeks.
***Indicating peelability or rusting after heating at 70 ° C for 2 weeks.

The above test results clearly indicate that the peel-off coating compositions of the present invention formulated with the film-forming vehicle resins, the organopolysiloxanes and the suitable solvents as specified can produce surface protecting coatings that have excellent peelability as well as rust inhibiting properties on the surface of a metals having high activity induced by polishing.

What is claimed is:

1. A resin composition for a peel-off coatings comprising
   (a) 100 parts by weight of at least one film-forming resin selected from the group consisting of polyvinyl chloride resins, polyvinyl acetate resins, vinyl chloride-vinyl acetate copolymeric resins, acrylic resins, polyvinyl alcohols, polyethylenes, methyl cellulose, ethyl cellulose, nitrocellulose, acetyl cellulose, acetylbutyl cellulose, and natural rubber,
   (b) from 0.1 to 40 parts by weight of at least one organopolysiloxane represented by the general formula

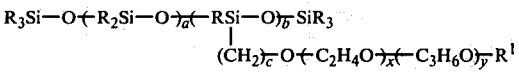

where R is a substituted or unsubstituted monovalent hydrocarbon group, $R^1$ is a hydrogen atom or a monovalent hydrocarbon group, a has a value from zero to 150 inclusive, b has a value from 2 to 50 inclusive, c has a value from zero to 5 inclusive, x has a value from 2 to 40 inclusive and y has a value from zero to 40 inclusive, and
   (c) a solvent.

2. The resin composition for peel-off coatings as claimed in claim 1 wherein the substituted or unsubstituted monovalent hydrocarbon group represented by the symbol R is selected from the class consisting of alkyl, alkenyl, cycloalkyl, aryl, aralkyl, and halogen-substituted monovalent hydrocarbon groups.

3. The resin composition for peel-off coatings as claimed in claim 1 wherein $R^1$ is a hydrogen atom.

4. The resin composition for peel-off coatings as claimed in claim 1 wherein the value of c is from 1 to 5, inclusive.

5. The resin composition for peel-off coatings as in claim 1 wherein the amount of component (b) is in the range from 1 to 30 parts by weight per 100 parts by weight of component (a).

6. A method for the preparation of the resin composition for peel-off coatings as set forth in claim 1 which comprises the steps of blending components (a), (b) and (c) into a homogeneous mixture, and heating the mixture at a temperature between 40° C. and the boiling point of component (c).

7. The method as claimed in claim 6 wherein the heating is conducted for 1 to 6 hours.

* * * * *